US008660299B2

(12) United States Patent
Cochran et al.

(10) Patent No.: US 8,660,299 B2
(45) Date of Patent: Feb. 25, 2014

(54) AUTOMATED PERSON IDENTIFICATION AND LOCATION FOR SEARCH APPLICATIONS

(75) Inventors: Edward L. Cochran, Minneapolis, MN (US); Rand P. Whillock, North Oaks, MN (US); Bruce W. Anderson, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 1148 days.

(21) Appl. No.: 11/903,667

(22) Filed: Sep. 22, 2007

(65) Prior Publication Data

US 2009/0080696 A1    Mar. 26, 2009

(51) Int. Cl.
*G06K 9/00*    (2006.01)

(52) U.S. Cl.
USPC ............................. 382/103; 382/118; 382/181

(58) Field of Classification Search
USPC .......................................... 382/103, 118, 181
See application file for complete search history.

(56) References Cited

U.S. PATENT DOCUMENTS

| 7,035,313 | B2* | 4/2006 | Fry ................................ 375/132 |
| 7,130,454 | B1* | 10/2006 | Berube et al. .................. 382/118 |
| 7,149,325 | B2* | 12/2006 | Pavlidis et al. ............... 382/103 |
| 7,245,216 | B2* | 7/2007 | Burkley et al. ........... 340/539.13 |
| 7,738,008 | B1* | 6/2010 | Ball .............................. 348/159 |
| 7,791,477 | B2* | 9/2010 | Sharma ......................... 340/567 |
| 7,920,626 | B2* | 4/2011 | Fernandez et al. ........ 375/240.16 |
| 2002/0136432 | A1* | 9/2002 | Koike et al. .................... 382/103 |
| 2004/0117638 | A1* | 6/2004 | Monroe ........................ 713/186 |
| 2004/0148518 | A1* | 7/2004 | Grundback et al. ........... 713/201 |
| 2004/0225681 | A1* | 11/2004 | Chaney et al. .............. 707/104.1 |
| 2005/0117022 | A1* | 6/2005 | Marchant .................. 348/207.11 |
| 2005/0178220 | A1 | 8/2005 | Kolarczyk et al. |
| 2006/0058954 | A1 | 3/2006 | Haney |
| 2006/0213290 | A1 | 9/2006 | Kolarczyk et al. |
| 2007/0036395 | A1* | 2/2007 | Okun ............................ 382/115 |
| 2007/0039030 | A1* | 2/2007 | Romanowich et al. ........ 725/105 |
| 2007/0040895 | A1* | 2/2007 | Barbeau et al. ............ 348/14.01 |
| 2007/0177023 | A1* | 8/2007 | Beuhler et al. .............. 348/211.3 |
| 2007/0182540 | A1* | 8/2007 | Marman ...................... 382/103 |
| 2007/0257985 | A1* | 11/2007 | Estevez et al. ................ 348/143 |

* cited by examiner

*Primary Examiner* — Eric Rush
(74) *Attorney, Agent, or Firm* — Kermit Lopez; Luis Ortiz; Kevin Soules

(57) ABSTRACT

A "be on the look out" or BOLO device is an unsupervised device that can be deployed at a particular location to watch for a specific target or person. A camera produces scene images that the BOLO device analyzes to determine if they contain a pattern matching a target descriptor. If a matching pattern is found, then the BOLO device emits an alarm signal. The alarm signal can contain the BOLO device's location or identification. A location database can produce the device's location when given the device's identification. A target transmitter can supply new target descriptors to deployed BOLO devices.

17 Claims, 3 Drawing Sheets

AUTOMATED PERSON IDENTIFICATION AND LOCATION FOR SEARCH APPLICATIONS

TECHNICAL FIELD

Embodiments relate to pattern recognition and face recognition. Embodiments also relate to wireless communication, device identification, and signaling.

BACKGROUND OF THE INVENTION

In the past, attempts to find people have been based on search parties and paper flyers. Search parties scoured an area looking for a lost or wanted person. Since the lost person could well be mobile, searchers are often required to dedicate resources to supporting stationary observers and redundant searches in case the lost person wandered back into a previously searched area. Flyers alerted the public to watch for the person. This approach required a searcher or a member of the public to actually observe the person in order for the search to succeed.

Modern technology has added remote sensing to the effort. Video cameras often monitor public places and produce video recordings or video signals. The recordings and signals can be routed to a central location having people or specialized equipment that can scour the recordings or signals for the sought person. For example, a video recording from the camera in an automated teller machine can be watched to see if a sought person appears. Specialized equipment can produce a face descriptor from an image or artists rendition of a person. Other equipment in the central location can then automatically scan video recordings and signals for that person. In this manner, a person's past presence at a location can be determined.

Further advances in technical capability, however, can lead to advances in automated systems and methods for seeking people, not in person, or after the fact, but remotely, and in real time. As such systems and methods that exploit more recent innovations are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that a relatively inexpensive and unsupervised device, called a BOLO device (for "be on the look out") can watch for a person. A BOLO device has a camera, computer, target storage module, target recognition module, and means for communicating. The camera acquires image scenes that may contain recognizable targets such as faces. The target storage module stores target descriptors. The target recognition module analyzes the image scenes to determine if an image scene contains a pattern matching the target descriptor. For example, the target descriptor can be a picture of a face or a mathematical description of a face. Faces in the image scene can be examined to see if they match the target face.

It is also an aspect of the embodiments that upon finding a match to the target, the target recognition module produces a recognition signal. An alarm module receives the recognition signal and causes the communications means to transmit an alarm signal. The alarm can be traced to the transmitting BOLO device or can contain information from which the location of the transmitting BOLO device can be derived.

A BOLO device can be constructed to use available communication means, depending on the environment (rural, urban, wireless-enabled).

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

A "be on the look out" or BOLO device is an unsupervised device that can be deployed at a particular location to watch for a specific target or person. A camera continually produces scene images that the BOLO device analyzes to determine if they contain a pattern matching a target descriptor. If a matching pattern is found, then the BOLO device emits an alarm signal. The alarm signal can contain the BOLO device's location or identification. A location database can produce the device's location when given the device's identification. A target transmitter can supply new target descriptors to deployed BOLO devices.

Figure 1:
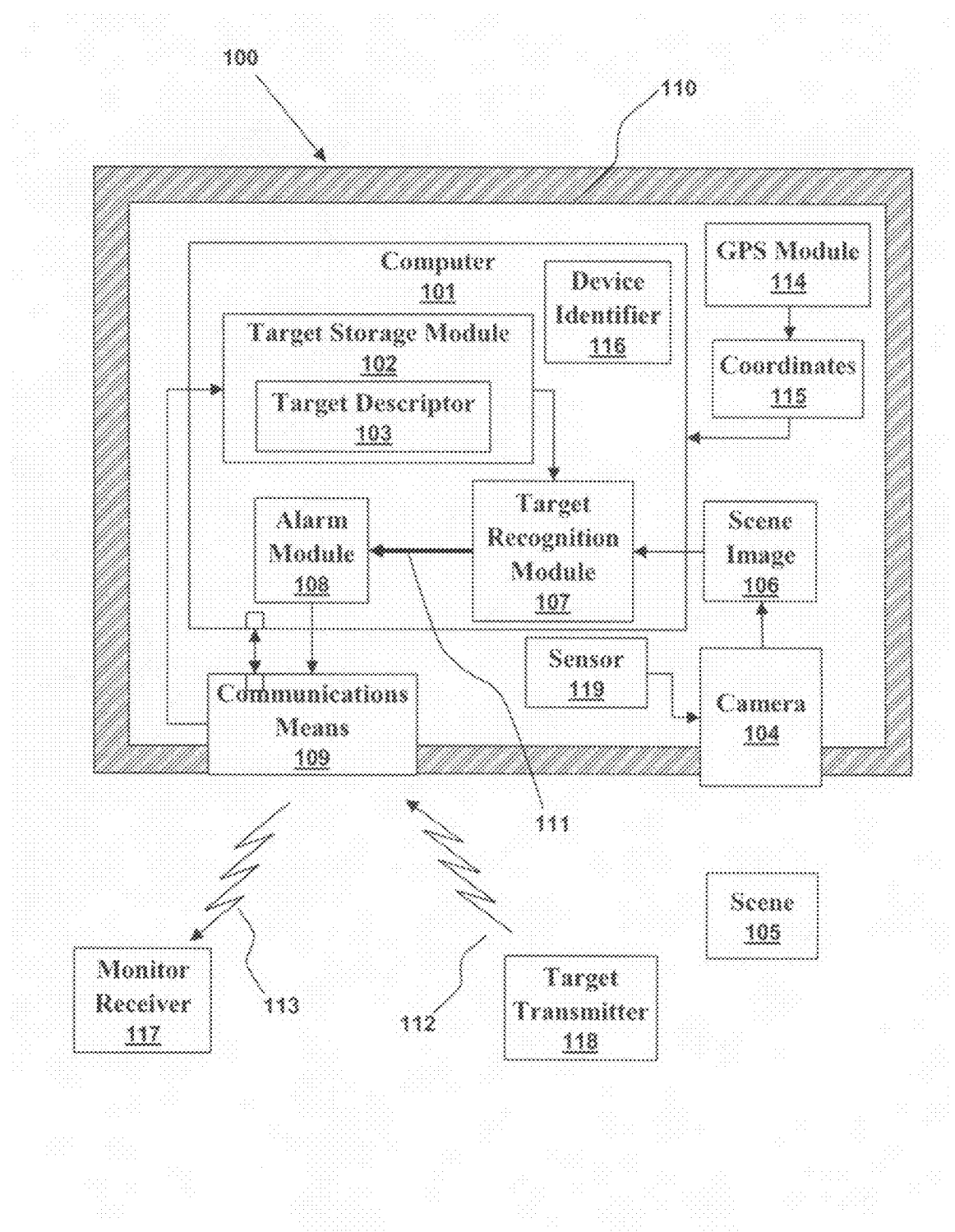
FIG. 1 illustrates a BOLO device in accordance with aspects of the embodiments.

FIG. 1 illustrates a BOLO device 100 in accordance with aspects of the embodiments. A BOLO housing 110 contains a computer 101, camera 104, a communications means 109, and a GPS module 114. The camera images a scene 105 to produce scene images 106 that can be passed to a target recognition module 107 running on the computer 101. The computer also has a target storage module 102 that stores a target descriptor 103. The target recognition module 107 obtains the target descriptor 103 and looks for a pattern in the image scenes 106 that matches the target descriptor 103. Those practiced in the arts of pattern recognition and face recognition are familiar with systems and techniques for determining when an image contains a pattern matching a target descriptor. Some of those techniques are image correlation, eigen analysis, orthogonal decompositions such as Fourier transforms, and non orthogonal decompositions such as wavelets.

Upon discovering a matching pattern, the target recognition module produces a recognition signal 111 that is passed to an alarm module 108. The alarm module 108 causes the communications means 109 to transmit an alarm signal 113 that can be received by a monitor receiver 117. The alarm signal can contain coordinates 115 obtained by a GPS module 114. The GPS module 114 is a global positioning system device that the BOLO device uses to discover its own position. As such, the BOLO device 100 can be deployed and moved about while maintaining the ability to transmit its own location.

A target transmitter 118 can send a target signal 112 to the BOO device 100. The target signal 112 contains a target descriptor that can be stored in the target storage module 102. As such, the BOLO device can be remotely reprogrammed to watch for a new target.

A BOLO device can also contain a device identifier 116. The device identifier can be transmitted as part of the alarm signal 117. The device identifier can be used to find the BOLO device's location when the GPS module is non functioning or not present. A location database can store BOLO device locations in association with device identifiers. The location of a BOLO device 100 having a specific device identifier can be found by querying the location database. In some embodiments, the monitor receiver 117 automatically queries the location database to more quickly display the probable location of the target.

The camera 104 can be a video camera or can be a computer triggered still camera. A computer triggered still camera is a camera that produces a scene image upon receiving a trigger signal from a computer. As such, a control module running in the computer can trigger the camera at a slow interval, such as once per 5 seconds, such that a low power BOLO device with a slow computer can monitor an area. The rate of scene image acquisition and analysis can be controlled and coordinated by a control module running on the computer. An alternative implementation could trigger the still image camera with a sensor 119 that detects when a potential subject is present in the field of view. Such a sensor 119 could be sound, IR or motion based.

Figure 2:
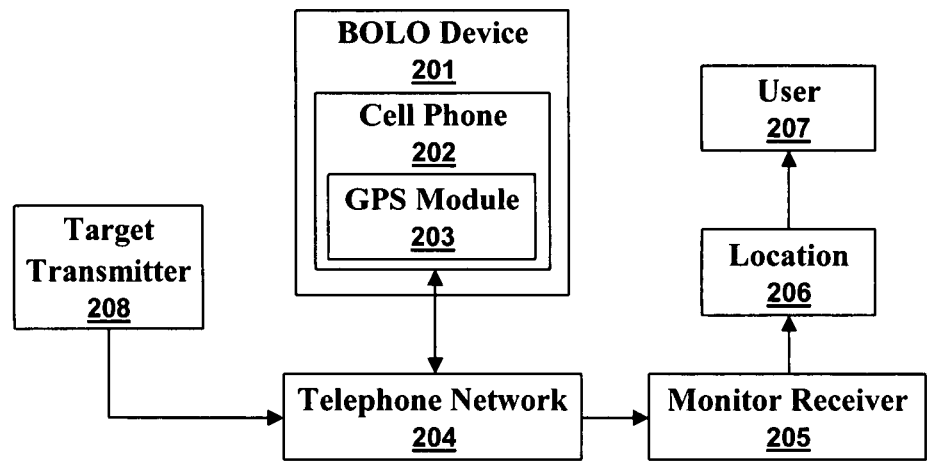
FIG. 2 illustrates a BOLO device using a GPS enabled cell phone in accordance with aspects of the embodiments.

FIG. 2 illustrates a BOLO device 201 using a GPS enabled cell phone 202 in accordance with aspects of the embodiments. A GPS enable cell phone 202 contains a GPS module 202. An alarm module can cause the cell phone 202 to dial a phone number and send a data message, to send a text message, or to use another data messaging service. The message can contain GPS coordinates obtained from the GPS module 203. The message can be routed through a telephone network 204 to a monitor receiver 205. The monitor receiver 205 can obtain the coordinates from the message and pass a location 206 to a user 207. The user 207 can then proceed to the location 206 and greet the target.

A target transmitter 208 can be a telephonic device or messaging device that contacts the cell phone 202 in the BOLO device 201 and passes it a new target descriptor.

Figure 3:
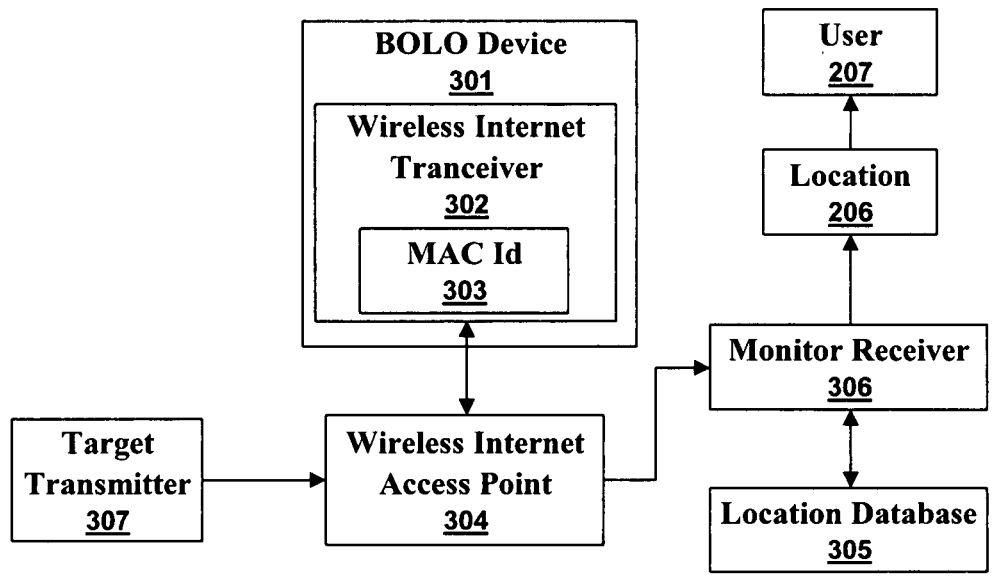
FIG. 3 illustrates a BOLO device using a wireless internet transceiver in accordance with aspects of the embodiments.

FIG. 3 illustrates a BOLO device 301 using a wireless internet transceiver 302 in accordance with aspects of the embodiments. All internet transceivers have a unique MAC Id that can be used as a device identifier. The alarm module can cause the wireless internet transceiver 302 to send an internet protocol (IP) message to a wireless internet access point 304 that then routes the IP message to the monitor receiver 306. Here, the monitor receiver 306 can be a computer connected to the internet. The access point can be a privately owned and operated access point or can be a public or open access point such as those commonly provided at cafes, airports, and hotels.

The monitor receiver 306 can get the BOLO device 310 MAC Id 303 from the IP message and use it to query a location database 305. The location database 305 provides a location 206 to a user 207. The target transmitter 307 can be any internet enabled device. The target transmitter 307 can send an IP message containing a target descriptor to the BOLO device 301.

Figure 4:
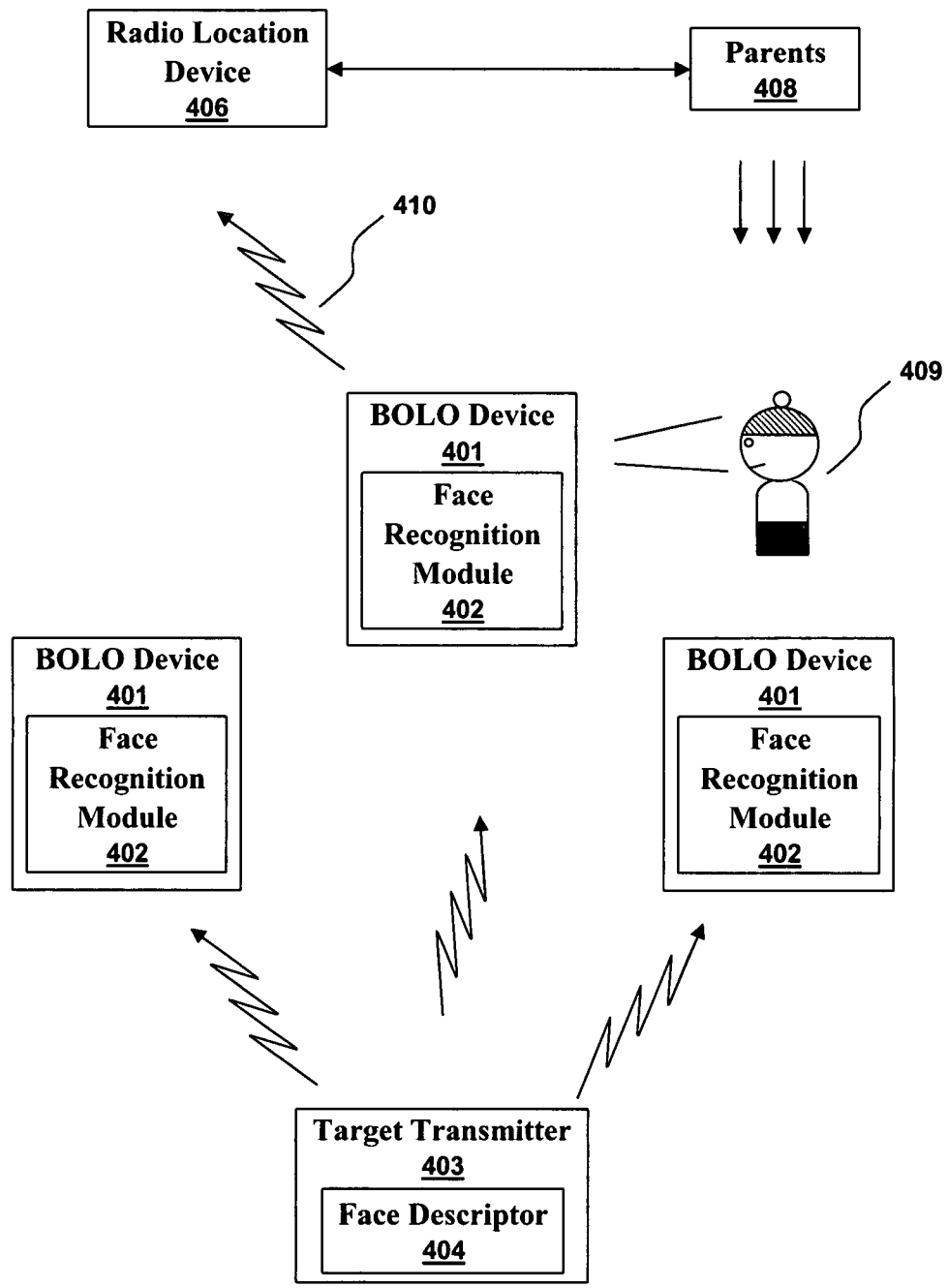
FIG. 4 illustrates a BOLO array implementing an Amber alert in accordance with aspects of the embodiments.

FIG. 4 illustrates a BOLO array implementing an Amber alert in accordance with aspects of the embodiments. The BOLO array has a number of BOLO devices 401. When an Amber alert is issued, the target transmitter 403 can be furnished with a face descriptor 404. The face descriptor 404 is then transmitted to the BOLO devices 401. In FIG. 4, the target recognition modules in the BOLO devices 401 are face recognition modules 402. One of the BOLO devices 401 discovers a matching face and sends an alarm signal 410. For an unspecified reason, no coordinates or location is found for the alarming BOLO device. A radio location device 406, however, points the authorities in the right direction and the parents 408 rush to their child 409.

Those familiar with radio location or radio signal tracking are familiar with radio location devices. Radio location devices are typically an array of antennas, possibly handheld, that can triangulate a radio signal to find its location or bearing.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An unsupervised monitoring device comprising:
a plurality of unsupervised BOLO devices comprising, at least one dedicated BOLO device, at least one cell phone, and at least one wireless internet transceiver, wherein each of said plurality of BOLO devices further comprises:
a housing, a computer, a means for communications, and a camera that produces a multitude of scene images, wherein the housing contains the computer, the means for communications, and the camera;
a target storage module storing a target descriptor;
a pattern matching target recognition module running on the computer, wherein said pattern matching target recognition module is configured to perform at least one of Eigen analysis, orthogonal decompositions, and nonorthogonal decompositions;
a control module associated with said computer that triggers said camera at a slow interval of one frame per five seconds providing a low power mode; and
an alarm module that causes the communications means to transmit an alarm signal upon receiving a recognition signal;
a target transmitter comprising a telephonic device, that passes said plurality of BOLO devices said target descriptor; and
a monitor receiver configured to receive and process said alarm signal;
wherein the pattern matching target recognition module obtains the scene images, obtains the target descriptor and produces the recognition signal upon discovering that any one of the scene images contains a pattern matching the target descriptor.

2. The plurality of unsupervised BOLO devices of claim 1 further comprising a GPS module associated with each of said plurality of unsupervised BOLO devices that each of the unsupervised BOLO devices uses to discover its own position, wherein the GPS module supplies coordinates of the associated BOLO device, wherein the GPS module is inside the housing, and wherein the alarm signal comprises the coordinates of the associated BOLO device.

3. The plurality of unsupervised BOLO devices of claim 1 wherein the target descriptor is received by the communications means from the target transmitter and stored in the target storage module.

4. The plurality of unsupervised BOLO devices of claim 1 wherein each of said unsupervised BOLO devices has an associated device identifier comprising a MAC ID wherein the alarm signal comprises the device identifier.

5. The plurality of unsupervised BOLO devices of claim 1 wherein the target descriptor is a picture of a face or a mathematical description of a face.

6. The plurality of unsupervised BOLO devices of claim 1 wherein the alarm module causes said communications means to transmit said alarm signal by at least one of:
dialing a phone number and sending a data message;
sending a text message, and
using a data messaging service.

7. The plurality of unsupervised BOLO devices of claim 1 wherein each of said plurality of unsupervised BOLO devices further comprises a non-optical sound sensor for detecting when a target is present thereby triggering the camera to collect imagery.

8. A system comprising:
a monitor receiver, a target transmitter, a location database, and a multitude of BOLO devices comprising, at least one dedicated BOLO device, at least one cell phone, and at least one wireless internet transceiver;
wherein each BOLO device comprises a housing, a means for communications, a camera that produces a multitude of scene images, a target storage module storing a target descriptor, a pattern matching target recognition module, wherein said pattern matching target recognition module is configured to perform at least one of Eigen analysis, orthogonal decompositions, and nonorthogonal decompositions, and an alarm module wherein the housing contains the means for communications, the camera, the target storage module, the target recognition module, and the alarm module;
wherein the target transmitter passes said multitude of BOLO devices said target descriptor such that the BOLO devices receive the target descriptor and store the target descriptor in their target storage modules;
wherein for each BOLO device the pattern matching target recognition module obtains the scene images, obtains the target descriptor and produces a recognition signal upon discovering that any one of the scene images contains a pattern matching the target descriptor;
wherein each BOLO device includes a control module that triggers said camera at a slow interval of one frame per five seconds providing a low power mode;
wherein each BOLO device transmits an alarm signal when the communications means receives the recognition signal; and
wherein the monitor receiver receives and processes the alarm signal and thereafter provides a user an alert that the target has been found.

9. The system of claim 8 wherein each BOLO device further comprises a device identifier comprising a MAC ID and wherein each alarm signal comprises the device identifier of the transmitting BOLO device.

10. The system of claim 9 wherein the location database associates each device identifier with one of a multitude of device locations.

11. The system of claim 8 further comprising a radio location device comprising an array of antennas that receives the alarm signal, triangulates a position from a radio signal, and indicates a direction based on said position to the BOLO device transmitting the alarm signal regardless of the presence of an accurate GPS related coordinate in the alarm signal.

12. The system of claim 8 wherein each BOLO device further comprises a GPS module that the BOLO device uses to discover its own position and for supplying coordinates of the associated BOLO device, wherein the GPS module is inside the housing, and wherein each alarm signal comprises the coordinates of the associated BOLO device.

13. The system of claim 8 wherein said target transmitter further comprises a telephonic device.

14. The system of claim 8 wherein the target descriptor is a picture of a face or a mathematical description of a face.

15. The system of claim 8 further comprising:
a location database wherein each BOLO device further comprises a device identifier comprising a MAC ID, wherein each alarm signal comprises the device identifier of the transmitting BOLO device, and wherein each device identifier is associated with one of a multitude of device locations;
wherein the target transmitter that transmits the target descriptor to the BOLO devices such that the BOLO devices receive the target descriptor and store the target descriptor in their target storage modules comprises a telephonic device; and
wherein the target descriptor is a picture of a face or a mathematical description of a face.

16. The system of claim 8 further comprising:
a radio location device that receives the alarm signal and indicates a direction to the BOLO device transmitting the alarm signal regardless of the presence of an accurate coordinate in the alarm signal;
wherein the target transmitter that transmits the target descriptor to the BOLO devices such that the BOLO devices receive the target descriptor and store the target descriptor in their target storage modules comprises a telephonic device; and
wherein the target descriptor is a picture of a face or a mathematical description of a face.

17. The system of claim 8 further comprising:
a wherein the target transmitter that transmits the target descriptor to the BOLO devices such that the BOLO devices receive the target descriptor and store the target descriptor in their target storage modules comprises a telephonic device;
wherein the target descriptor is a picture of a face of a mathematical description of a face; and
wherein each BOLO device further comprises a GPS module that the at least one BOLO device uses to discover its own position and for supplying coordinates, wherein each alarm signal comprises the coordinates, and wherein the communication means transmits said alarm signal by at least one of:
dialing a phone number and sending a data message;
sending a text message, and
using a data messaging service.

* * * * *